Dec. 16, 1952 W. A. FORDECK 2,621,933

SPINDLE FOR PHONOGRAPH RECORD CHANGERS

Filed March 8, 1947

Inventor
William A. Fordeck
Clarence J. Loftus
Atty.

Patented Dec. 16, 1952 2,621,933

UNITED STATES PATENT OFFICE 2,621,933

SPINDLE FOR PHONOGRAPH RECORD CHANGERS

William A. Fordeck, Kendallville, Ind., assignor to The Magnavox Company, Fort Wayne, Ind., a corporation of Delaware Application March 8, 1947, Serial No. 733,385

9 Claims. (Cl. 274—10)

The present invention relates to an automatic record changer, and more particularly to an improved spindle of the type which has an offset portion so as to support in horizontal position a stack of phonograph records.

In the construction of record changers for automatic phonographs it has been found desirable to provide a mechanism which will play ten inch and twelve inch records intermixed. In such an arrangement a vertical spindle is employed which has an offset portion for holding in position a stack of records until a record is to be released for reproduction in proper sequence. It has been found, however, that where a stack of records is supported by a relatively small amount of record material adjacent the center hole, that there is apt to be considerable wear unless certain precautions are taken. When a record is released for reproduction the remaining records move downwardly a distance equal to the thickness of the record just released. It will readily be appreciated that while this distance may appear to be small, the impact on the edge of the record adjacent to center hole may be sufficient to damage the record, and in certain instances even cause the record to split or break. It therefore is necessary to provide some means or some operation for retarding the downward movement of the records when a record has been released.

In certain constructions now commonly employed the bottom record of the stack is shifted horizontally while supporting the remaining records. The weight of the remaining records on the bottom record during this action of the record changer also produces considerable wear on the phonograph record. It therefore would be desirable to minimize this wear. In the shifting of the bottom record and in its release precautions must also be taken to minimize or substantially eliminate the effect of any sharp edges or surfaces which may come in contact with the phonograph record adjacent to center hole.

In accordance with the present invention these and other factors and conditions are amply taken care of by an improved structure which supports the stack of records in a balanced manner.

It therefore is an object of the present invention to provide an improved spindle for an automatic record changer for phonographs.

It is another object of the present invention to provide an improved spindle for an automatic record changer which retards the downward movement of the stack of records when a single record is released.

Another object of the present invention is to provide an improved spindle for an automatic record changer which supports the record on both sides of the central hole thereby minimizing the possibility of fractures and minimizing the necessity of stabilizing the records by other means.

A still further object of the present invention is to provide an improved spindle for an automatic record changer which releases the lowermost record without that record supporting other records at that time.

A still further object of the present invention is to provide an improved spindle for an automatic record changer which releases the record evenly from diametrically opposite points so as to cause a minimum wear of the material surrounding the hole in the center of the record.

Other and further objects of the present invention subsequently will become apparent by reference to the following description taken in conjunction with the accompanying drawings wherein.

Figures 1, 2, 3, 4, 5, 6:
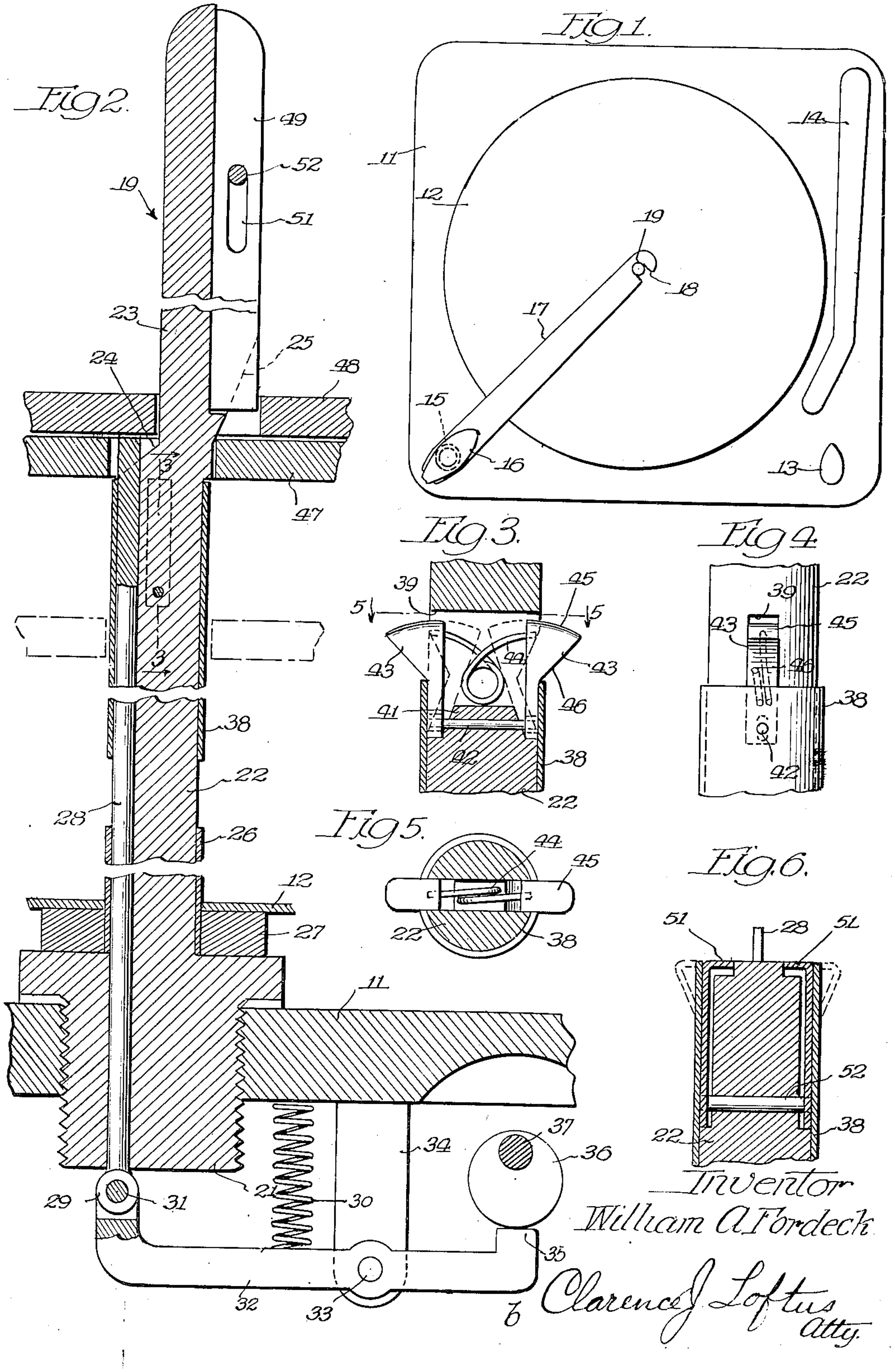
Figure 1 is a plan view of a record changer embodying the present invention.
Figure 2 is a vertical cross-sectional view showing the details of the construction of the present invention.
Figure 3 is a cross-sectional view in the direction of the arrows along the line 3—3 of Figure 2.
Figure 4 is a side view of the construction shown in Figure 3.
Figure 5 is a top view seen in the direction of the arrows along the line 5—5 of Figure 3.
Figure 6 shows another modification of the construction of details illustrated in Figures 3, 4 and 5.

Referring to the drawing, it will be seen that there has been shown a record changer having a base 11 above which is positioned a turntable 12. The base 11 carries a control knob 13 for initiating, stopping and controlling the operation of the sequence operation mechanism supported beneath the base 11. At one corner of the base 11 there is mounted a phonograph pick-up arm 14. At the opposite corner there is provided a post 15 which carries a vertically reciprocable shaft terminating in a knob 16. The knob 16 is connected to a record support or stabilizing bar 17. The outer extremity of the bar 17 has a recess 18 which is adapted to surround the upper portion of the spindle.

The record support arm 17 has its notch 18 surrounding the spindle 19. The spindle 19 is shown in detail in Figure 2. The support panel or motor board 11 is provided with a threaded aperture into which is fitted the spindle support 21 which carries the spindle 19. Immediately above the support 21 the spindle 19 has a cylindrical section 22 which at its upper extremity is connected to an offset cylindrical section 23. At the juncture of the two sections 22 and 23, there is formed on one side an inclined support shoulder 24. Diametrically opposite from the shoulder 24, the cylindrical portion 23 has a tapered or inclined surface 25 which joins the outer configuration of the upper end of the cylindrical portion 22.

The lower portion of the cylindrical member 22 is surrounded by a loose sleeve 26 which in turn is surrounded by the turntable 12 which is supported by a suitable bearing member 27 resting upon the spindle support 21.

The cylindrical portion 22 of the spindle 19 is provided with a channel which carries a reciprocable round rod 28 which extends through the spindle support 21 and terminates in an eye 29. The eye 29 engages a pin or rod 31 carried by a lever 32 which is journalled at 33 in a support bracket 34. The support bracket 34 is secured to the underside of the motor board 11. One extremity of the lever 32 is provided with a cam follower surface 35 which is engaged by a cam 36. The lever 32 is biased by a spring 30 to follow the cam. The cam 36 is carried by a shaft 37 which is driven by the sequence operation mechanism supported beneath the motor board 11. The cam 36 when actuated moves the lever 32 to reciprocate the rod 28 so as to bring about, as subsequently will become apparent, the release of a phonograph record carried on spindle 19.

The loose sleeve 26 extends above the turntable 12 a distance which may be equal to the thickness of the maximum number of records to be played at one loading of the record changer. Above the sleeve 26 there is provided another sleeve 38 which is secured to the reciprocable rod 28.

The sleeve 38 therefore reciprocates with the rod 28 and actuates a mechanism which is shown in detail in Figures 3, 4 and 5. The cylindrical portion 22 of the spindle 19 has a transversely arranged opening 39. At the bottom of the opening 39 the cylindrical portion 22 has an upwardly extending boss 41 which carries a pin 42. The outer extremities of the pin 42 pass through suitable enlarged openings in a pair of support members 43 which are biased outwardly by a spring 44. Each of the members 43 has a curved top surface 45 which engages the underside of a phonograph record adjacent to center hole thereof. Each of the members 43 has an inclined surface 46 which is engaged by the sleeve 38 when it is reciprocated. The sleeve 38 when reciprocated engages the surfaces 46 to cause the members 43 to be moved inwardly against the action of the spring 44. When the members 43 have been moved inwardly by the sleeve 38, as illustrated in Figure 2, the record 47 is released so that it may drop down onto the turntable 12 or any record thereon.

When the spindle 19 is loaded with a stack of records, the reciprocable sleeve 38 will be in a downward position so that the support members 43 are in the expanded position shown in Figure 3. The lowermost record 47 of the stack of records will engage the inclined shoulder 24 which interconnects with the cylindrical portions 22 and 23 of the spindle 19. The lowermost record therefore moves to the position shown in Figure 2 where it is supported by a pair of support members 43. The next record immediately above the record 47 will be at the position shown since it cannot move toward the left in Figure 3 because of the sliding pawl 49 which is mounted in a suitable recess in the cylindrical portion 23. The sliding pawl 49 is provided with an elongated slot 51 which is engaged by the pin 52 so as to retain the pawl 49 in position. The pawl 49 moves upwardly when records are removed from the spindle 19 after having been played.

It now may be assumed that the desired records have been placed upon the spindle 19 and that operation of the phonograph has been initiated by actuating the control knob 13 shown in Figure 1. Thereupon the sequence operation mechanism will move the shaft 37 which carries the cam 36. The cam 36 bears against the cam surface 35 of the lever 32, thereby to move the rod 28 and the sleeve 38 upwardly. The upward movement of the sleeve 38 gradually moves inward the pair of supports 43 on which the record stack rests. At about the time that the members 43 have been moved inwardly so as to release the lower record 47, the upper extremity of the rod 28 engages the next record 48 so as to support the remainder of the stack of records at that time. Thus when the record 47 actually is released, the upper extremity of the rod 28 is supporting the remaining records, and hence the final inward movement of the support members 43 is opposed only by the weight of the lowermost record 47. Thus it will be appreciated that the record 47 upon release is not subjected to any force such as that which would occur if the entire stack of records were resting thereon at the time of release. The record 47, therefore, is free to drop down onto the turntable 12.

After the record 47 has been released, the sleeve 38 and the rod 28 are lowered so as to gradually lower the entire stack of records. The lowering of the sleeve 38 permits the support members 43 to again move outwardly to the position shown in Figure 3. The record 48 is supported by the rod 28 until the upper extremity of the rod 28 moves below the inclined surface 24 which interconnects the cylindrical portions 23 and 22. Only the bottom record of the remaining stack can follow the inclined surface 24 since the next record is retained in position by the sliding pawl 49 as is apparent from the drawing in Figure 2.

From the foregoing it is apparent that when the lower record is released, the remainder of the stack of records is lowered slowly by a progressive action of cam 36 which eliminates any such impact of the record 48 upon the inclined surface 24. By having two supporting surfaces 45 arranged diametrically opposite a much lesser stabilizing effect is required than in other constructions. The supporting of the lower record on opposite sides of the spindle 19 reduces the possibility of fractures of the record due to an uneven or unbalanced support. By having the support surfaces 45 curved, the wear on the phonograph record adjacent to center hole is held at a minimum.

Another variation of the structure shown in Figures 3, 4 and 5 is illustrated in Figure 6. In this latter figure those components which are the same as those described previously have been given similar reference characters. The sleeve 38 in the embodiment shown in Figure 6 compresses a pair of spring members 51 which have their lower extremities connected to a transversely arranged pin 52. When the sleeve 38 is lowered, the upper surfaces of the straight members 31 move outwardly to the dotted line position to support the phonograph record at two diametrically opposite points. It therefore will be appreciated that the variation illustrated in Figure 6 functions in a manner similar to the embodiment illustrated in Figures 3, 4 and 5.

While for the purpose of illustrating and describing the present invention, this preferred embodiment has been illustrated in the drawings, it is to be understood that the invention is not to be limited thereby since such variations are contemplated in the components employed and their arrangement as may be commensurate with the spirit and scope of the invention set forth in the following claims.

What I desire to protect by United States Letters Patent is claimed as follows:

1. In an automatic phonograph record changer, a vertical spindle having a cylindrical lower portion, and an offset cylindrical top portion, said cylindrical top portion having adjacent its bottom an inclined surface extending longitudinally for a distance greater than the thickness of a phonograph record, said lower cylindrical portion having adjacent its top an inclined surface extending longitudinally a distance less than the thickness of a record, a pair of outwardly biased support means mounted transversely of said lower portion adjacent said top thereof, so that the top surface of said support means is substantially in the same plane as the juncture between the cylindrical surface of said lower portion and the lower edge of the inclined plane which extends upwardly a distance less than the thickness of a phonograph record, reciprocable means mounted on said lower portion for actuating said support means to release a record, and reciprocable record retarding means arranged to extend above said lower cylindrical portion a distance sufficient to support the remainder of a stack of records whenever the lowermost record is being released.

2. In an automatic phonograph record changer of the mixer type, a vertical spindle having a cylindrical bottom portion and an offset cylindrical top portion, said top portion having an inclined surface extending longitudinally for a distance greater than the thickness of a single record, a sliding pawl mounted in a groove in the top section so as to intersect said inclined surface, said bottom portion having an inclined surface extending a distance less than the diameter of a record, a reciprocable rod extending longitudinally in a groove in said bottom portion, outwardly biased support members mounted transversely of said bottom portion adjacent the top thereof for supporting a phonograph record at diametrically opposite points, and sleeve means carried by said rod for compressing said support means to release a record, said rod having a record retarding portion extending upwardly above said sleeve a distance sufficient to engage the penultimate record in a stack of records at the time that said sleeve compresses said support member.

3. In an automatic phonograph record changer of the mixer type, a turntable record spindle having a lower portion and an offset upper portion, said upper portion having an inclined portion adjacent the bottom thereof which extends longitudinally a distance greater than the thickness of a phonograph record, a siliding pawl mounted in a groove in said upper portion so as to intersect with and extend beyond said inclined surface, said lower portion adjacent the top thereof having an inclined surface which extends a distance longitudinally which is less than the thickness of a record and serves to shift a record in a horizontal plane, a pair of pivotally mounted outwardly biased support members mounted in a transverse recess in said lower portion adjacent the top thereof to support a record at diametrically opposite points, said members having arcuate top surfaces, reciprocable means mounted on said lower portion for compressing said members to receive a record, and reciprocable means adapted to move with first reciprocable means to engage the penultimate record and support the remainder of the stack of records whenever a record is being released.

4. In an automatic phonograph record changer, a turntable record spindle having a lower portion and an offset upper portion, said lower portion adjacent the top thereof having an inclined surface which extends a distance longitudinally which is less than the thickness of a record and serves to shift a record in a horizontal plane, a pair of outwardly biased support members mounted transversely of said lower portion adjacent the top thereof to support a record at diametrically opposite points adjacent to the center hole thereof, and reciprocable means mounted on said lower portion for actuating said support members to release a record, said reciprocable means having a record retarding portion to engage the penultimate record to support the remainder of the stack of records when a record is being released, and to gradually lower said stack of records onto said outwardly biased support members when said reciprocable means reverses direction of movement.

5. In an automatic phonograph record changer, a turntable record spindle having a lower portion and an offset upper portion, said lower portion adjacent the top thereof, having an inclined surface which extends a distance longitudinally which is less than the thickness of a record and which serves to shift a record in a horizontal plane, a groove extending longitudinally of said lower portion so as to intersect said inclined surface, a pair of outwardly biased support means mounted transversely of said lower portion adjacent the top thereof to support a phonograph record at diametrically opposite points adjacent the center hole thereof, a reciprocable rod mounted in said groove, and a sleeve surrounding the upper portion of said lower spindle portion for displacing said outwardly biased support means thereby to release the bottom record, said rod having a record retarding portion to engage the penultimate record adjacent the center hole thereof to support the remainder of the stack of records when a record is being released and to gradually lower the remainder of the stack of records onto said outwardly biased support means when said reciprocable rod and said sleeve move downwardly.

6. In an automatic phonograph record changer, a turntable record spindle having a lower portion and an offset upper portion, said lower portion adjacent the top thereof having a horizontally inclined surface which extends upwardly a distance which is less than the thickness of a record and serves to shift a record in a horizontal plane, a groove extending longitudinally of said lower portion and intersecting said inclined surface, a pair of pivotally mounted outwardly biased support members arranged transversely of said lower portion adjacent the top thereof, said members having arcuate top surfaces to support a record at diametrically opposite points, and record retarding means including a rod mounted in said groove for engaging the penultimate record to support the remainder of the stack of records whenever said support members are compressed to release a record.

7. In an automatic phonograph record changer, a vertical spindle including a record-centering lower portion, a record-receiving top portion offset with respect to said lower portion, a record-shifting member adjacent the top of said lower portion whereby the lowermost record on said top portion may be shifted onto the lower portion of said spindle, retractable record supporting mechanism mounted on said lower portion adjacent the top thereof, a vertically movable record lowering rod mounted in said lower portion in alignment with said shifting member and movable into engagement with the lowermost record on said top portion for lowering said lowermost record into engagement with said supporting mechanism and means carried by said record lowering rod to actuate said retractable record supporting mechanism.

8. In an automatic phonograph record changer, a vertical spindle including a record-centering lower portion and a record-receiving top portion offset with respect to said lower portion, a record shifting member adjacent the top of said lower portion whereby the lowermost record on said top portion may be shifted onto the lower portion of said spindle, laterally movable record supporting mechanism mounted on said lower portion adjacent the top thereof, a vertically movable record lowering member mounted in said lower portion in alignment with said shifting member and movable into engagement with the lowermost record on said top portion for lowering said lowermost record into engagement with said supporting mechanism and means carried by said record lowering member for actuating said laterally movable record supporting mechanism.

9. In an automatic phonograph record changer, a vertical spindle including a record-centering lower portion and a record-receiving top portion offset with respect to said lower portion to provide a shoulder adjacent the top of said lower portion, said shoulder being downwardly inclined from the top portion whereby the lowermost record on said top portion may be shifted onto the lower portion of said spindle, retractable record supporting members movably mounted on said lower portion adjacent the top thereof, a vertically movable record lowering rod mounted in said lower portion in alignment with said shoulder and movable into engagement with the record resting on said shoulder for lowering it into engagement with said supporting members and means carried by said record lowering rod to actuate said retractable record supporting mechanism.

WILLIAM A. FORDECK.

REFERENCES CITED

The following references are of record in the file of this patent:

UNITED STATES PATENTS

| Number | Name | Date |
|---|---|---|
| 1,438,000 | Underhill | Dec. 5, 1922 |
| 2,287,098 | Habegger | June 23, 1942 |
| 2,368,068 | Becwar | Jan. 30, 1945 |

FOREIGN PATENTS

| Number | Country | Date |
|---|---|---|
| 822,026 | France | Sept. 6, 1937 |
| 896,091 | France | Feb. 12, 1945 |
| 69,274 | Norway | May 28, 1945 |
| 64,649 | Denmark | July 8, 1946 |